Patented Aug. 12, 1952

2,606,935

UNITED STATES PATENT OFFICE 2,606,935

ALKYLENE OXIDE-METHYLOL PHENOL REACTION PRODUCTS

Robert W. Martin, Lenox, Mass., assignor to General Electric Company, a corporation of New York No Drawing. Application January 4, 1951, Serial No. 204,467

11 Claims. (Cl. 260—613)

This application is a continuation-in-part of my earlier filed application Serial No. 122,128, filed October 18, 1949, now Patent Number 2,579,329, and assigned to the same assignee as the present invention.

This invention is concerned with novel compositions of matter. More particularly, the invention relates to the reaction product of a mixture of ingredients comprising (1) a methylol phenyl ether corresponding to the general formula—

I
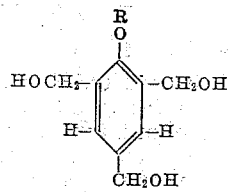

where R represents a member of the class consisting of aliphatic, cycloaliphatic, and aryl-substituted aliphatic groups including their halogen-substituted derivatives, and (2) an alkylene oxide corresponding to the general formula II      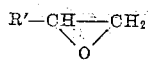

where R' is a member selected from the class consisting of hydrogen, aliphatic, alkoxyaliphatic, aryl, aliphatic-substituted aryl, aryl-substituted aliphatic, and aryloxyaliphatic radicals. The invention also includes reaction products of a mixture of ingredients comprising (1) a methylol phenyl ether corresponding to the general formula:

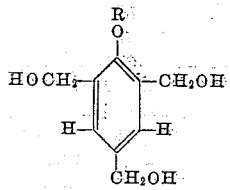

(2) a methylol phenyl ether corresponding to the general formula—

III
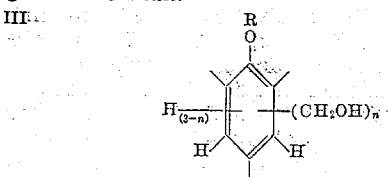

where R has the meaning given above, and $n$ is an integer equal to from 1 to 2, inclusive, and where compound (1) is preferably in an amount equal to at least 50% but may be present in an amount ranging below 50%, for example, from about 10 to 90%, and (3) an alkylene oxide corresponding to the general formula—

where R' has a meaning as given above.

Among the groups which R in the above formula may represent are, for instance, alkyl groups, e. g., methyl, ethyl, propyl, isopropyl, butyl, etc.; unsaturated aliphatic, e. g., vinyl, allyl, methallyl cyclopentenyl, cyclohexenyl, etc.; cyclohexanyl, cyclopentanyl, etc.; aryl-substituted aliphatic (aralkyl), for instance, benzyl, etc.; styryl, etc.; as well as halogenated derivatives of the aforementioned aliphatic groups, for example, the aforementioned groups containing chlorine, bromine, fluorine, etc., either on the aliphatic or aromatic grouping and either monohalogenated or polyhalogenated, for example, containing from two or more halogens, for example, chlorines; etc., in the organic groups.

R' in addition to being the alkyl, unsaturated aliphatic and aryl-substituted aliphatic groups mentioned above for R, may also be aryl, e. g., phenyl, etc.; alkoxyaliphatic, e. g., methoxyethyl, ethoxymethyl, ethoxybutyl, etc.; aliphatic-substituted aryl, e. g., tolyl, xylyl, ethylphenyl, etc.; aryl-substituted aliphatic, e. g., benzyl, etc.; aryloxy-aliphatic, e. g., phenoxymethyl, phenoxyethyl, tolyloxypropyl, etc.

Among the compounds which may be formed are, for instance, those corresponding to the general formula:

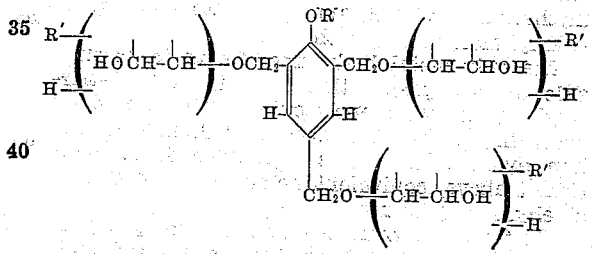

where R and R' have the meanings given above. The position of the R' will depend on the manner in which the alkylene oxide ring reacts.

The above disclosed reaction product can be made by effecting reaction between the alkylene oxide and the preformed methylol phenyl ether derivative (Formula I). The reaction is believed to be stepwise and it is possible to react one, two or three of the methylol groups with the alkylene oxide.

In the following examples, methods are disclosed for preparing the sodium and barium salts of trimethylol phenol which can then be reacted with the appropriate ingredient to give the methylol phenyl ether described above in Formula I. The ether thus obtained or mixtures of ethers which correspond to Formulas I and III may then in turn be reacted with the alkylene oxide defined by Formula II.

The sodium and barium salts of trimethylol phenol may be formed very simply and isolated as crystalline compounds. More particularly, the crystalline sodium and barium salts of trimethylol phenol may be prepared by effecting reaction between about three mols of formaldehyde and one mol of phenol in the presence of about one mol of alkali such as the hydroxides of sodium and barium at a temperature such that no resinous material is formed. This temperature has been found to range up to about 65° C., above which temperature undesired side reactions take place. The salt of trimethylol phenol can then be precipitated by diluting or pouring the reaction mixture into a suitable water-miscible solvent and separated from the liquid by filtration, decantation or other suitable means.

While the example above calls for molar quantities of alkali, only catalytic quantities of alkali, for example, about one per cent by weight, are required for the phenol-formaldehyde reaction. It will be seen therefore that phenol and formaldehyde may be allowed to react to form the trimethylol compound in the presence of a small amount of alkali at which time the rest of the alkali may be added to form the salt.

Many solvents are suitable for precipitating the salts of trimethylol phenol, e. g., methanol, ethanol, n-propanol, isopropanol, tertiary butanol, secondary butanol, isobutanol, n-butanol, tertiary amyl alcohol, allyl alcohol, diacetone alcohol, butyl carbitol, pyridine, 2-(2'-hydroxyethyl)-pyridine, phenyl cellosolve, acetone, acetonitrile, propionitrile, morpholine, diethylenetriamine, methylal, dimethyl cellosolve, dioxane, etc. In general alcohols with no more than four carbon atoms are the most efficient precipitating agents and particularly those with two or three carbon atoms. The preferred precipitating agents are ethanol, propanol, isopropanol and acetone. Of these, ethanol is most suitable from the point of view of low cost, availability and purity of the product obtained. Mixtures of the above precipitating agents also have been found to be very useful. Among the mixtures which are suitable are, by volume, 50–50 n-butanol and methanol, 50–50 methanol and acetone and 50–50 n-amyl alcohol and methanol.

The only metal hydroxides found to be suitable for the preparation of salts of 2,4,6-tris-(hydroxymethyl)phenols or trimethylol phenols according to this invention are sodium and barium hydroxides. While formaldehyde is mentioned above, equivalent amounts of paraformaldehyde may be used.

The following examples illustrate the preparation of the sodium and barium salts of trimethylol phenol or 2,4,6-tris(hydroxymethyl)-phenol:

*Example I*

To 188 parts by weight (2 mols) of phenol were added 90 parts by weight (2.25 mols) of sodium hydroxide which had been previously dissolved in seventy parts by weight of water. The mixture was cooled and allowed to crystallize; 588 parts by weight (7.3 mols) of formalin (37.2% by weight formaldehyde) were added and the mixture stirred. The temperature of the reaction mixture rose spontaneously to a maximum of 45° C. and then dropped slowly. The mixture was kept at room temperature fifteen to twenty hours, dehydrated under vacuum with heat until the temperature in the flask rose to 45° C. and poured into several times its volume of ethanol. After 3–4 hours the resultant precipitate of sodium trimethylol phenate was filtered and dried.

Theoretical yield, 412 parts by weight.

Actual yield, 335 parts by weight or 81.3% of theory.

*Example II*

Formalin in the amount of 140 parts by weight (1.73 mols), forty-seven parts by weight (0.5 mol) of phenol and forty-seven parts by weight (0.55 equivalent) anhydrous barium hydroxide dissolved in seventy-five parts by weight of hot water were mixed in that order. The reaction mixture was kept at a temperature of 30° C. or lower for two hours. The mixture was allowed to react for twenty-four hours at room temperature. Ethanol in the amount of 1600 parts by weight was added with vigorous mechanical stirring. The resulting precipitate of barium trimethylol phenate, after standing a few hours, was filtered off, washed with acetone and dried in a vacuum desiccator.

Theoretical yield, 125.8 parts by weight.

Actual yield, 97.9 parts by weight or 77.8% of theory.

*Example III*

To 76.2 parts by weight (0.945 mol) of formalin were added while stirring 23.5 parts by weight (0.25 mol) of phenol and twelve parts by weight (0.33 mol) of sodium hydroxide, dissolved in fifteen parts by weight of water. The temperature of the reaction mixture was held at 30° C. or less for two hours. The mixture was put in an oven for twenty-two hours at a temperature of 40° C. Next, 804 parts by weight of n-propanol was poured into the reaction mixture and the mix stirred. The resulting precipitate of sodium trimethylol phenate was filtered off, washed with acetone and ether and dried in a vacuum desiccator.

Theoretical yield, 51.5 parts by weight.

Actual yield, 50.8 parts by weight or 98% of theory.

Other methods for making the sodium and barium salts of symmetrical trimethylol phenol are more specifically disclosed in my aforementioned copending application Serial No. 122,128. The latter application also discloses steps taken to identify the salts formed as being actually the ones claimed to have been obtained.

It is to be noted that, consistent with the rules of orientation, only those phenols possessing free reactive hydrogen atoms in all three positions ortho and para to the phenolic hydroxyl group can form trimethylol compounds, e. g. phenol, m-cresol and 3,5-xylenol. However, from actual experiment, it has been found that 3,5-xylenol forms a product in which the salts of uni- and bis(hydroxymethyl) compounds predominate along with resinous products. No evidence has been obtained of the formation of the salt of the tris(hydroxymethyl) compound. When m-cresol is used only low yields of the salts of tris(hydroxymethyl) compound can be obtained due to the fact that the resins are readily formed. From the examples given above, it will also be noted that the reaction may be carried out at various temperatures, the lower temperatures ranging at around 0° C. requiring a reaction time of several days while the reaction at temperatures around 60° C. takes place in several hours. However, temperatures of over 65° C. will cause undesirable side reaction.

The sodium and barium 2,4,6-tris(hydroxymethyl)phenates may be reacted with other compounds to provide a class of primary polyhydric alcohols with a wide range of applications in the chemical, plastics and coating arts. Notable among such compounds are the ethers formed by the etherification of the phenolic hydroxyl groups. Such etherification considerably retards the tendency of the tris(hydroxymethyl) compound to resinify and hence makes it available for a number of other reactions and applications. For example, etherification of the phenolic hydroxyl group greatly improves the alkali resistance of resinous compositions containing them compared to the same compositions wherein the phenolic group has not been etherified.

The ethers prepared from the sodium and barium 2,4,6-tris(hydroxymethyl)phenates may be represented by the general formula:

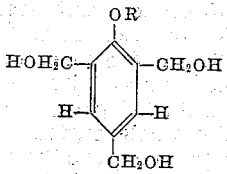

where R represents a member of the class consisting of aliphatic, cycloaliphatic and aryl-substituted aliphatic groups including their halogen-substituted derivatives. The following examples illustrate the preparation of these types of compounds.

Example IV

A mixture of 139 parts by weight of sodium 2,4,6-tris(hydroxymethyl)phenate, 126 parts by weight of methyl iodide and 440 parts by weight of methanol was divided equally between three bottles. The bottles were sealed and placed in an oven at 65° C. for about fifteen to twenty hours. The bottles were cooled and opened. The methanol was boiled off and the products were dissolved in amyl alcohol. The amyl alcohol solution was washed with an aqueous solution of sodium carbonate. The amyl alcohol was distilled off under vacuum. The product, 1-methoxy-2,4,6-tris(hydroxymethyl)benzene was a viscous light brown syrup.

Yield=118 parts by weight
Theory=134 parts by weight
Methoxyl content=15.33%, 15.70%
Theory=15.66%

Example V

To twenty-one parts by weight of sodium 2,4,6-tris-(hydroxymethyl)phenate placed in a bottle, eighty parts by weight of methanol and sixteen parts by volume of methyl iodide were added. The bottle was sealed and heated for six hours at 68° C. The reaction mixture was allowed to stand for two days at room temperature. The methanol was evaporated and the product esterified using acetic anhydride and pyridine as esterifying agent. The ester, 1-methoxy-2,4,6-tris-(acetoxymethyl)benzene, was distilled.

Saponification equivalent=107, 106.4
Theory=108
Carbon:
    Found=59.53%, 59.57%
    Theory=59.26%
Hydrogen:
    Found=5.96, 6.01
    Theory=6.22

Example VI

To 210 parts by weight of sodium 2,4,6-tris-(hydroxymethyl)phenate was added a solution of 130 parts by weight of allyl bromide in 475 parts by weight of methanol. The mixture was refluxed with stirring for two hours. The methanol was distilled off under vacuum and amyl alcohol added. The amyl alcohol solution was washed with a solution of saturated sodium carbonate-potassium chloride and was dried over anhydrous sodium sulphate. The amyl alcohol was removed under vacuum. The product, 1-allyloxy-2,4,6-tris(hydroxymethyl)benzene, was a brown syrup.

Yield=140 parts by weight. Theory=224.

Example VII

Same as Example VI except that the mixture was heated for two and one-half to three hours at 45° C. (and then at 60° C.) for two hours. For a number of reactions of this example the conversion to the allyl ether was found to range from 90 per cent to 100 per cent.

Example VIII

Forty-two parts by weight of the sodium 2,4,6-tris(hydroxymethyl)phenate was placed in a bottle with forty parts by volume of a 2.5 per cent solution of sodium hydroxide. 26.6 parts by weight of benzyl chloride was added as well as thirty-two parts by weight of methanol. The reaction ingredients were shaken at 55° C. for forty-eight hours. The cooled contents of the bottle were poured into 200–300 parts by weight of hot water, heated for ten to fifteen minutes and stirred. When stirring was stopped, the product separated out as an oily layer. The washed product was dissolved in acetone, filtered, and the water and acetone distilled off. The product, 1-benzyloxy-2,4,6-tris(hydroxymethyl)benzene, was a brown syrup. The theoretical yield was 54.8 parts by weight, the actual yield was 38.92 parts by weight or a 71 per cent yield.

Example IX

Example VIII was repeated using nineteen parts by weight of 2-methallyl chloride in place of the benzyl chloride. The methanol which had been added in Example VIII to increase the solubility of the benzyl chloride in the reaction mixture was not employed. The product, 1-(2'-methallyloxy)-2,4,6-tris(hydroxymethyl)benzene, was a very viscous, almost solid brown syrup. The actual yield was 32.92 parts by weight as compared with the theoretical 47.6 parts by weight or a 69 per cent yield.

Example X

Example VIII was again repeated using 23.3 parts by weight 2,3-dichloropropene-1 in lieu of the benzyl chloride. Methanol was not used. The product, 1-(2'-chloroallyloxy)-2,4,6-tris(hydroxymethyl)benzene was a viscous brown syrup. The yield of 44.52 parts by weight was 86 per cent of the theoretical value of 51.7 parts by weight.

Example XI

Example VIII was repeated using 23.3 parts by weight of 1,3-dichloropropene-1 in place of benzyl chloride and without the use of methanol. The 1-(3'-chloroallyloxy)-2,4,6-tris(hydroxymethyl)benzene was a viscous brown syrup. The yield was 40.82 parts by weight or 79 per cent of the theoretical value of 51.7 grams.

Example XII

Example VIII was repeated using 41.6 parts by weight of isoamyl iodide in place of benzyl chloride and with forty parts by weight of methanol. The product yield was 9.19 parts by weight as against a theoretical 50.8 parts by weight or 18 per cent. The 1-isoamyloxy-2,4,6-tris-(hydroxymethyl)benzene was obtained as a viscous brown syrup.

Example XIII

Example VIII was again repeated using 28.8 parts by weight of n-butyl bromide in place of the benzyl chloride along with forty parts by weight of methanol. The yield of 1-butyloxy-2,4,6-tris(hydroxymethyl)benzene as a viscous brown syrup was 27.85 parts by weight or 57.8% of the theoretical value of forty-eight parts by weight.

Example XIV

One hundred and ninety-two parts by weight of the sodium salt of trimethylol phenol was dissolved in water and 49 parts by weight of dimethyl sulphate added. The mixture was stirred for two hours, 71 parts by weight of sodium hydroxide and 92 parts by weight of dimethyl sulphate added and stirring continued for about 12 hours. The temperature of the mixture was then raised to boiling and extracted while hot with n-amyl alcohol. The product, trimethylol anisole, was obtained in a yield of 135 parts by weight, or a 73% of theory. All of the product was refluxed several hours with an excess of acetic anhydride. The acetic acid and excess acetic anhydride was removed by heating under vacuum. The resulting ester was washed twice with water and distilled at a temperature of 170–180° C. under a reduced pressure of 1–2 mm. of mercury to yield purified tri-(acetoxymethyl)-anisole.

While ethers of 2,4,6-tris(hydroxymethyl)-phenols have been found to be very useful, they are rather expensive to produce in the pure state because of the separation process. It has been found that for many applications in connection with making the presently claimed compositions, the ethers of the tris(hydroxymethyl)phenols can tolerate certain amounts of the ethers of 2-(hydroxymethyl)phenol, 4-(hydroxymethyl)phenol, 2,6-bis(hydroxymethyl)phenol and 2,4-bis-(hydroxymethyl)phenol. It has been further found that the presence of the ethers of the uni- and bis-compounds does not detract appreciably from the beneficial results obtained. The amount of the tris(hydroxymethyl)phenyl ethers present in the mixture may be varied and may be present in the major proportion of more than fifty per cent by weight. However, percentages ranging from, e. g., 10 to 90 per cent, may be present. In general, if at least 2.5 mols of formaldehyde are used to each mol of phenol, the major proportion of the reaction product will be the tris(hydroxymethyl)compound. Consequently, the corresponding ether mixture will predominate in the ether of the tris(hydroxymethyl)phenol. The formula of such mixtures may be represented as follows:

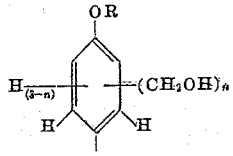

where R has the meaning given above, and $n$ is an integer equal to at least 1 and not more than three, and in which the compound in which $n$ is equal to three is in the major proportion.

Examples illustrating the production of such mixtures of methylol phenol ethers are as follows:

Example XV

Formalin in the amount of 980 parts by weight (12 mols) of 37.5% solution of formaldehyde was added to 376 parts by weight of phenol and mixed thoroughly. A solution of 176 parts by weight of sodium hydroxide in 200 parts by weight of water was added slowly to the mixture with cooling. The reaction mixture was then placed in an oven at 40° C. for fifteen to twenty hours. Analysis showed that 95.6 per cent of the formaldehyde had reacted. The above phenate solution was placed in a flask equipped with a stirrer. To the solution was added 326.5 parts by weight of allyl chloride and the whole stirred vigorously and heated at 60° C. for about two hours. The etherification reaction ran to about ninety-five per cent of completion.

Example XVI

Three hundred and fifty parts by weight of phenol and 900 parts by weight of 37.3% aqueous formaldehyde were mixed with stirring. To the solution was added 164 parts by weight of sodium hydroxide in 170 parts by weight of water and the whole reacted for six and one-half hours at 40° C. Analysis showed that 86.6 per cent of the formaldehyde had reacted to give about sixty per cent sodium tris-(hydroxymethyl)phenate along with the uni- and bis(hydroxymethyl) phenates. Three hundred and three parts by weight of allyl chloride was added and the mixture reacted in a pressure reactor at 60° C. for three hours with vigorous stirring. Analysis showed that 98.7 per cent of the allyl chloride reacted. The aqueous layer was drawn off and the organic layer dehydrated by heating under a vacuum. The yield was 650 parts by weight equal to three in the major proportion.

Example XVII

Formalin in the amount of 980 parts by weight (12 mols) of 37.5% solution of formaldehyde was added to 376 parts by weight of phenol and mixed thoroughly. A solution of 176 parts by weight of sodium hydroxide in 200 parts by weight of water was added slowly to the mixture with cooling. The reaction mixture was then placed in an oven at 40° C. for fifteen to twenty hours. Analysis showed that 95.6 per cent of the formaldehyde had reacted. The above phenate solution was placed in a flask equipped with a stirrer. To the solution was added 326.5 parts by weight of allyl chloride and the whole stirred vigorously and heated at 60° C. for about two hours. The etherification reaction ran to about ninety-five per cent of completion.

Example XVIII

Three hundred and fifty parts by weight of phenol and 900 parts by weight of 37.3% aqueous formaldehyde were mixed with stirring. To the solution was added 164 parts by weight of sodium hydroxide in 170 parts by weight of water and the whole reacted for six and one-half hours at 40° C. Analysis showed that 86.6 per cent of the formaldehyde had reacted to give about sixty per cent sodium tris(hydroxymethyl)phenate along with the uni- and bis(hydroxymethyl)-phenates. Three hundred and three parts by weight of allyl chloride was added and the mixture reacted in a pressure reactor at 60° C. for three hours with vigorous stirring. Analysis showed that 98.7 per cent of the allyl chloride reacted. The aqueous layer was drawn off and the organic layer dehydrated by heating under a vacuum. The yield was 650 parts by weight of the allyl ethers of the mixed uni-, bis- and tris(hydroxymethyl)phenols with the tris compound being present as the major component.

*Example XIX*

Three hundred and thirty-two parts by weight of phenol (96% pure) and 835 parts by weight of a 36.4% aqueous solution of formaldehyde and 160 parts by weight of sodium hydroxide in 167 parts by weight of water were mixed and reacted for seven and one-half hours at 40° C. at which time 83.5 per cent of the formaldehyde had reacted to give a major proportion of sodium tris(hydroxymethyl)phenate as the product. Allyl chloride in the amount of 273 parts by weight was added and the whole mass heated to 60° C. in an air tight reactor for three and one-half hours with vigorous stirring. At the end of this period 93.1 per cent of the allyl chloride had reacted. The isolated organic layer was dehydrated to yield 625 parts by weight of the allyl ether of mixed uni-, bis-, and tris(hydroxymethyl)phenol with the tris compound as the major component as a brown somewhat viscous oil.

The hydroxy groups of the tris(hydroxymethyl) phenyl ethers may be converted to ether groups by reacting (1) an aklylene oxide corresponding to the general formula

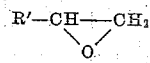

where R' represents a member of the class consisting of hydrogen, aliphatic, alkoxyaliphatic, aliphatic-substituted aryl, aryl, aryl-substituted aliphatic, and aryloxyaliphatic groups with (2) a tris(hydroxymethyl) phenyl ether corresponding to the general formula

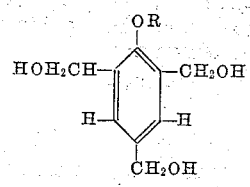

where R has the meaning given above.

Theoretically, if three mols of alkylene oxide, e. g., propylene oxide, are employed for each mol of tris(hydroxymethyl) phenyl ether, each of the three hydroxymethyl groups would carry a hydroxyalkyl, e. g., hydroxypropyl, substituent. However, since the products formed by reaction of alkylene oxides with tris (hydroxymethyl) phenol ethers are in themselves reactive with alkylene oxides, polyglycols may form on one hydroxymethyl while another group is left unreacted. It therefore becomes evident that pure compounds are not obtained, but instead a mixture of compounds are formed. If more than three mols of alkylene oxide is reacted with tris-(hydroxymethyl) phenyl ether, then polyglycol ethers are of necessity formed. The excess alkylene oxide, above three mols, reacts with the hydroxyl group of the already formed glycol ether to give polyglycol ether groups.

*Example XX*

One hundred parts by weight of 1-allyloxy-2,4,6 tris(hydroxymethyl)benzene, ten parts by weight of one normal sodium hydroxide and sixty parts by weight of ethylene oxide were heated in a sealed container for seventy-two hours at 40° C. The product was a very light straw-colored, honey-like material which was somewhat soluble in water.

The product was a polyethylene glycol ether derivative of the 1-allyloxy-2,4,6-tris (hydroxymethyl)benzene wherein an average of one molecule of ethylene oxide has reacted with each hydroxymethyl group.

Other oxides such as butylene oxide, styrene oxide, glycidyl phenyl ether, glycidyl allyl ether, and butadiene monooxide among others may also be reacted to give analogous compounds all of which are useful as plasticizers for various resins.

Here again, from an economical point of view, it is advantageous to use reaction products produced from a mixture of the uni-, bis- and tris(hydroxymethyl) compounds with the tris(hydroxymethyl) compound present in an amount of over fifty per cent as in the following examples. However, I do not intend to be limited to this per cent since smaller (e. g., 10 to 40 per cent) or larger per cents of the total of uni- and bis-(hydroxymethyl) compounds corresponding to the general formula

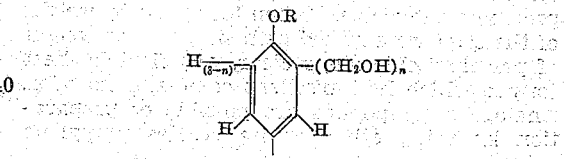

where R has the meaning given above and $n$ is an integer equal to from 1 to 2, inclusive, may also be used without departing from the scope of the invention.

*Example XXI*

Eighty-six parts by weight of a mixture of 1-allyloxy-2-(hydroxymethyl)benzene, 1-allyloxy-4-(hydroxymethyl)benzene, 1-allyloxy-2,4-bis(hydroxymethyl) benzene, 1-allyloxy-2,6-bis-(hydroxymethyl) benzene, and 1-allyloxy-2,4,6-tris(hydroxymethyl) benzene wherein the mixture as a whole contains an average of 2.6 hydroxymethyl groups for each benzene nucleus, forty-two parts by weight of propylene oxide and a trace of sodium hydroxide were heated overnight (about 16 hours) at 60° C. in a sealed container. The reacted mixture was filtered and neutralized with acid, washed several times with water and dehydrated under a vacuum to yield a clear honey-colored liquid. The compound was the reaction product of one molecule of propylene oxide for each hydroxymethyl group present in the mixture.

*Example XXII*

Eighty-six parts by weight of a mixture of the alloxy-, uni-, bis-, and tris(hydroxymethyl) benzenes, a trace of sodium hydroxide and twenty-nine parts by weight of propylene oxide were placed in a sealed bottle and heated at 60° C. for sixteen hours. The reaction mixture was neutralized with hydrochloric acid and the organic layer separated, washed several times with water and dehydrated under a vacuum. The product was a straw-colored syrup in which an average of 0.4–0.5 mol of propylene oxide has reacted for each hydroxymethyl group.

Example XXIII

The 1 - (2' - hydroxyethyloxy) - 2,4,6-tris(hydroxymethyl) benzene was first prepared by reacting about eighteen parts by weight of sodium 2,4,6-tris(hydroxymethyl)phenate with fourteen parts by weight of ethylene bromohydrin. The reactants were dissolved in forty parts by weight of water and heated at 40° C. for about three and one-half hours to give a pale, straw-colored water-soluble syrup. The product was refluxed with about eighteen parts by weight of propylene oxide for seven hours. Two parts by weight of sodium hydroxide in five parts by weight of water was added as a catalyst. At completion of the reaction, the sodium hydroxide was neutralized and the mixture dehydrated under a vacuum. The salt formed by neutralization of the catalyst was filtered off leaving a viscous, very pale-colored syrup in which approximately 0.65–0.70 mol of propylene oxide has reacted for each hydroxyl group present in the 1-(2'-hydroxyethyloxy)-2,4,6-tris(hydroxymethyl)benzene.

Example XXIV

A mixture of the alloxy- uni-, bis-, and tris-(hydroxymethyl)-benzenes was treated with propylene oxide in the presence of one per cent of caustic such as sodium hydroxide to produce a water insoluble syrup. This syrup was converted to a propionate ester by refluxing with propionic anhydride. When four parts by weight of the ester were milled with six parts by weight of polyvinyl chloride, a clear, very flexible sheet formed which had excellent color and no odor. Analogous compounds are possible of preparation by using other oxides besides propylene oxide.

Compositions of the above type have been found very useful in plasticizing alkyd resins, as wax modifiers, surface active agents and humectants. They are compatible with polyvinyl acetals, polyvinyl alcohol, phenol-aldehyde resins, etc., and can be used to modify the properties of these resins.

It will, of course, be apparent to those skilled in the art that instead of using the alkylene oxides employed in the foregoing examples, other alkylene oxides, many examples of which have been given above and in the formulas appearing in the application, may be employed without departing from the scope of the invention. In addition, the molar ratio of the alkylene oxide and the particular methylol phenol ether employed may also be varied within wide limits. Thus, although it is preferable to employ at least the same number of mols of alkylene oxide as there are hydroxyl groups around the benzene nucleus, it will be apparent that smaller molar amounts of the alkylene oxide may also be used whereby it is possible to obtain derivatives whereby some of the hydroxyl groups will not be replaced with the residue from the alkylene oxide. Thus, on a molar basis I may use, for example, from about 1 to 3, or even as high as 6 mols or more of the alkylene oxide per mol of the methylol phenyl ether. The tendency towards resinification of the trimethylol phenyl ethers is low due to the fact that the phenolic hydroxyl group is etherified. This permits the use of higher reaction temperatures above that possible where the phenolic hydroxyl group is not etherified.

The conditions of reaction whereby the reaction products are obtained may also be varied and the reaction may be carried out at temperatures ranging, for example, from room temperature to as high as 100° C. or somewhat higher.

The claimed compositions of matter are useful as intermediates in the preparation of other materials particularly esters thereof whereby esterification can take place of the hydroxyl groups of the alkylene oxide residue and of any hydroxyl groups remaining from the original methylol phenyl ether, to produce esters which are useful, for instance, as plasticisers for various resins, particularly the vinyl halide resin e. g., polyvinyl chloride, copolymers of vinyl chloride and vinyl acetate, etc. The compositions herein claimed are compatible with a number of resins, for example, polyvinyl acetals, polyvinyl alcohol, phenol-aldehyde resins, etc., and can be used to modify the properties of these resins.

Although it is difficult to isolate individual compounds as the result of the reaction of methylol phenyl ether with the alkylene oxide, the claimed compositions of matter are definite mixtures which can be reproduced at will following essentially the same conditions in each case. Their character and compositions can be determined by ascertaining the number of mols of alkylene oxide which have reacted with the methylol phenol ether.

What I claim as new and desire to secure by Letters Patent of the United States is:

1. A composition of matter comprising the product of reaction at a temperature ranging up to 100° C. of a mixture of ingredients comprising (1) a methylol phenol ether corresponding to the general formula:

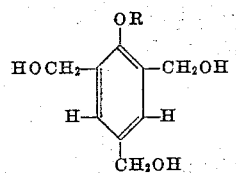

where R represents a member of the class consisting of aliphatic, cycloaliphatic, aryl-substituted aliphatic groups, and halogen-substituted derivatives of the aforesaid aliphatic groups, and (2) an alkylene oxide corresponding to the general formula:

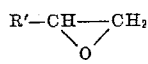

where R' is a member selected from the class consisting of hydrogen, aliphatic, aryl, alkoxyaliphatic, aliphatic-substituted aryl, aryl-substituted aliphatic, and aryloxyaliphatic radicals.

2. A composition of matter comprising the products of reaction at a temperature ranging up to 100° C. of a mixture of ingredients comprising (1) a mixture of methylol phenol ethers comprising (a) a methylol phenol ether corresponding to the general formula:

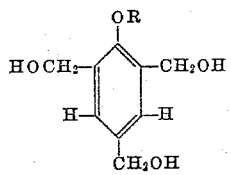

and (b) a mixture of methylol phenol ethers corresponding to the general formula:

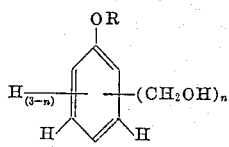

where R represents a member of the class consisting of aliphatic, cycloaliphatic, aryl-substituted aliphatic groups, and halogenated derivatives of the aforesaid aliphatic groups, and $n$ is an integer equal to from 1 to 2, inclusive, and (2) an alkylene oxide corresponding to the general formula:

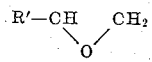

where R' is a member selected from the class consisting of hydrogen, aliphatic, aryl, alkoxyaliphatic, aliphatic-substituted aryl, aryl-substituted aliphatic, and aryloxyaliphatic radicals.

3. A composition of matter comprising the product of reaction at a temperature ranging up to 100° C. of a mixture of ingredients comprising (1) a methylol phenol ether corresponding to the general formula:

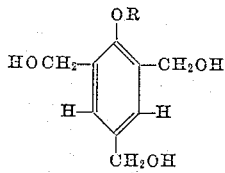

where R represents a member of the class consisting of aliphatic, cycloaliphatic, aryl-substituted aliphatic groups, and halogen-substituted derivatives of the aforesaid aliphatic groups, and (2) propylene oxide.

4. A composition of matter comprising the product of reaction at a temperature ranging up to 100° C. of a mixture of ingredients comprising (1) a methylol phenol ether corresponding to the general formula:

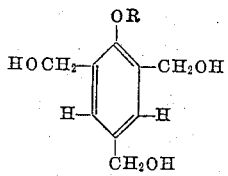

where R represents a member of the class consisting of aliphatic, cycloaliphatic, aryl-substituted aliphatic groups, and halogen-substituted derivatives of the aforesaid aliphatic groups, and (2) glycidyl allyl ether.

5. A composition of matter comprising the product of reaction at a temperature ranging up to 100° C. of a mixture of ingredients comprising (1) a methylol phenol ether corresponding to the general formula:

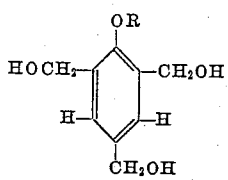

where R represents a member of the class consisting of aliphatic, cycloaliphatic, aryl-substituted aliphatic groups, and halogen-substituted derivatives of the aforesaid aliphatic groups, and (2) 3,4-epoxybutene-1.

6. A composition of matter comprising the product of reaction at a temperature ranging up to 100° C. of a mixture of ingredients comprising (1) a methylol phenol ether corresponding to the general formula:

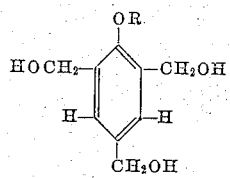

where R represents a member of the class consisting of aliphatic, cycloaliphatic, aryl-substituted aliphatic groups, and halogen-substituted derivatives of the aforesaid aliphatic groups, and (2) ethylene oxide.

7. A composition of matter comprising the product of reaction at a temperature ranging up to 100° C. of a mixture of ingredients comprising 1 - allyloxy - 2,4,6 - tris(hydroxymethyl) benzene and (2) propylene oxide.

8. A composition of matter comprising the product of reaction at a temperature ranging up to 100° C. of a mixture of ingredients comprising 1 - allyloxy - 2,4,6 - tris(hydroxymethyl) benzene and (2) glycidyl allyl ether.

9. A composition of matter comprising the product of reaction at a temperature ranging up to 100° C. of a mixture of ingredients comprising 1 - allyloxy - 2,4,6 - tris(hydroxymethyl) benzene and (2) 3,4-epoxybutene-1.

10. A composition of matter comprising the product of reaction at a temperature ranging up to 100° C. of a mixture of ingredients comprising 1 - allyloxy - 2,4,6 - tris(hydroxymethyl) benzene and (2) ethylene oxide.

11. A composition of matter comprising the product of reaction at a temperature ranging up to 100° C. of a mixture of ingredients comprising (1) 1 - methoxy - 2,4,6 - tris(hydroxymethyl) benzene and (2) propylene oxide.

ROBERT W. MARTIN.

REFERENCES CITED

The following references are of record in the file of this patent:

UNITED STATES PATENTS

| Number | Name | Date |
|---|---|---|
| 1,976,677 | Wittwer | Oct. 9, 1934 |
| 2,213,477 | Steindorff et al. | Sept. 3, 1940 |
| 2,495,232 | Drisch et al. | Jan. 24, 1950 |
| 2,499,365 | De Groote et al. | Mar. 7, 1950 |
| 2,503,726 | Greenlee | Apr. 11, 1950 |